(12) United States Patent
Takagi et al.

(10) Patent No.: US 9,833,007 B2
(45) Date of Patent: Dec. 5, 2017

(54) SOY MILK AND METHOD FOR PRODUCING SAME

(71) Applicant: The Nisshin OilliO Group, Ltd., Chuo-ku, Tokyo (JP)

(72) Inventors: Tetsuo Takagi, Yokosuka (JP); Susumu Hikichi, Yokosuka (JP)

(73) Assignee: THE NISSHIN OILLIO GROUP, LTD., Tokyo (JP)

(*) Notice: Subject to any disclaimer, the term of this patent is extended or adjusted under 35 U.S.C. 154(b) by 0 days.

(21) Appl. No.: 15/021,373

(22) PCT Filed: Nov. 17, 2014

(86) PCT No.: PCT/JP2014/080377
§ 371 (c)(1),
(2) Date: Mar. 11, 2016

(87) PCT Pub. No.: WO2015/072570
PCT Pub. Date: May 21, 2015

(65) Prior Publication Data
US 2016/0249632 A1    Sep. 1, 2016

(30) Foreign Application Priority Data

Nov. 15, 2013 (JP) ................ 2013-236674

(51) Int. Cl.
| | | |
|---|---|---|
| A23L 1/20 | (2006.01) | |
| A23C 11/10 | (2006.01) | |
| A23L 11/00 | (2016.01) | |

(52) U.S. Cl.
CPC .......... *A23C 11/103* (2013.01); *A23L 1/20* (2013.01); *A23L 11/00* (2016.08); *A23V 2002/00* (2013.01)

(58) Field of Classification Search
CPC ............ A23V 2250/1878; A23L 11/00
USPC ....................... 426/634, 629, 601
See application file for complete search history.

(56) References Cited

U.S. PATENT DOCUMENTS

| | | | |
|---|---|---|---|
| 2003/0180432 A1 | 9/2003 | Shimizu et al. | |
| 2006/0247310 A1* | 11/2006 | Shinohara | A23D 9/00 514/547 |
| 2007/0178217 A1 | 8/2007 | Ebashi | |

FOREIGN PATENT DOCUMENTS

| | | |
|---|---|---|
| JP | S-57-189657 A | 11/1982 |
| JP | H-06-245728 A | 9/1994 |
| JP | H-08-173050 A | 7/1996 |
| JP | H-10--25253 A | 1/1998 |
| JP | 2002-253164 A | 9/2002 |
| JP | 2003-230365 A | 8/2003 |
| JP | 2004-075653 A | 3/2004 |
| JP | 2006042652 A * | 2/2006 |
| JP | 2006-280276 A | 10/2006 |
| JP | 2009-159911 A | 7/2009 |
| JP | 2014-187972 A | 10/2014 |
| WO | 2015/013678 * | 1/2015 |

OTHER PUBLICATIONS

Dean, Ward, Nutrition Review, Medium Chain Triglycerides (MCTs), Apr. 22, 2013 found at https://nutritionreview.org/2013/04/medium-chain-triglycerides-mct/ 2017, pp. 1-9.*

International Search Report (PCT/ISA/210) dated Feb. 17, 2015, by the Japanese Patent Office as the International Searching Authority for International Application No. PCT/JP2014/080377.

Written Opinion (PCT/ISA/237) dated Feb. 17, 2015, by the Japanese Patent Office as the International Searching Authority for International Application No. PCT/JP2014/080377.

* cited by examiner

*Primary Examiner* — Helen F Heggestad
(74) *Attorney, Agent, or Firm* — Buchanan, Ingersoll & Rooney PC

(57) ABSTRACT

An object of the present invention is to provide: a soy milk having a pleasant flavor and suppressed soybean odor, raw smell, astringency, and so forth; and a method for producing the soy milk. Specifically, provided are: the soy milk; a soy-milk flavor improver containing, as an active ingredient, a triacylglycerol having a medium-chain fatty acid with 6 to 12 carbon atoms as a constituent fatty acid; an improved soy milk containing a soy milk and the soy-milk flavor improver; and a food and a drink containing the improved soy milk. A method for producing the improved soy milk is also provided.

6 Claims, No Drawings

SOY MILK AND METHOD FOR PRODUCING SAME

CROSS-REFERENCE TO RELATED APPLICATIONS

This application is a national stage application under 35 U.S.C. §371 of PCT/JP2014/080377 filed on Nov. 17, 2014, which claims the benefit of Japanese Patent Application No. 2013-236674, the contents of all of which are incorporated by reference.

TECHNICAL FIELD

The present invention relates to an improved soy milk. Specifically, the present invention relates to: an improved soy milk having a pleasant flavor and suppressed soybean odor, raw smell, astringency, and so forth; a food and a drink containing the improved soy milk; and methods for producing these. The present invention also relates to a method for improving a soy milk flavor.

BACKGROUND ART

Recently, the interest of consumers in health with foods has been quite increasing. For this reason, natural foods and functional foods have been popular. Among these, soy milk made from soybeans contains good quality protein and plant linoleic acid, and also contains plenty of nutrients such as vitamin E and lecithin. Hence, the amount of soy milk consumed in the form of functional food as a gift by nature is increasing year after year. Moreover, isoflavone, a component of soybean, has attracted attention because isoflavone has various physiological functions such as preventing osteoporosis, relieving menopausal disorders, and preventing arteriosclerosis.

Accordingly, numerous researches have been conducted heretofore on soy milk and the method for producing soy milk. Nevertheless, it is hardly said that soy milk is a beverage acceptable to anybody due to soybean odor, raw smell, astringency, and so forth peculiar to soybeans, which are generated in steps of grinding and extracting soybeans. The main cause of soybean odor and raw smell peculiar to soybeans is thought to be an action of lipoxygenase. To suppress this action, there have been such proposals as a production method in which grinding is performed under high temperature condition or under oxygen free condition, a production method in which lipoxygenase deficient soybeans are utilized, and other methods. However, none of these methods is said to be simple.

On the other hand, numerous researches have also been conducted to suppress soybean odor, raw smell, and astringency peculiar to soybeans by simply utilizing food additives. For example, Patent Literature 1 proposes a technique of adding whey protein to reduce the raw smell and astringency peculiar to soybeans, so that a soybean food is obtained which is easy to eat and has a favorable flavor. Moreover, Patent Literature 2 proposes a technique of adding palatinose to reduce unpleasant taste and odor derived from soybeans, so that soy milk is obtained which is excellent in light taste and aftertaste. Further, Patent Literature 3 proposes a technique of adding sugar phosphate derived from potato to reduce or improve the taste, the smell such as bitterness, astringency, and raw smell, and so forth, so that the usage and nutritional value of foods are expanded.

However, it cannot be said that sufficiently satisfactory results have been obtained. A technique has been demanded to more simply suppress soybean odor, raw smell, and astringency peculiar to soybeans.

Meanwhile, a medium-chain fatty acid and/or a triglyceride containing a medium-chain fatty acid are quickly absorbed, when taken into a body, and shortly thereafter burned in the liver to produce energy. Based on this tendency, for example, Patent Literature 4 proposes a food and a drink containing such medium-chain fatty acid and/or triglyceride containing a medium-chain fatty acid. Nevertheless, there is almost no report on soy milk containing such medium-chain fatty acid and/or triglyceride containing a medium-chain fatty acid. For example, Patent Literature 5 proposes a method for producing a dairy beverage by dissolving a lignan compound in a medium-chain fatty acid triglyceride, and adding this solution to soy milk. The invention has been made in order to develop a useful beverage for sufficiently taking lignan compounds, and the medium-chain fatty acid triglyceride is added merely as a solvent to solve the lignan. Moreover, the influence of the medium-chain fatty acid triglyceride on a sensory evaluation of the soy milk is not mentioned at all. Hence, it has not been known at all that medium-chain fatty acid triglycerides suppress soybean odor, raw smell, astringency, and so forth of soy milk.

CITATION LIST

Patent Literatures

Patent Literature 1: Japanese Patent Application Publication No. Hei 8-173050
Patent Literature 2: Japanese Patent Application Publication No. 2003-230365
Patent Literature 3: Japanese Patent Application Publication No. 2002-253164
Patent Literature 4: Japanese Patent Application Publication No. 2004-075653
Patent Literature 5: Japanese Patent Application Publication No. 2006-280276

SUMMARY OF INVENTION

An object of the present invention is to provide: an improved soy milk having a pleasant flavor and suppressed soybean odor, raw smell, astringency, and so forth; a food and a drink containing the improved soy milk; methods for producing these; and a method for improving a soy milk flavor.

The present inventors have earnestly studied whether it is possible to obtain soy milk having suppressed soybean odor, raw smell, astringency, and so forth by adding various fats and/or oils. Surprisingly, the inventors have found that blending soy milk with a specific amount of a triacylglycerol having a medium-chain fatty acid with 6 to 12 carbon atoms can achieve the object of the present invention. This finding has led to the completion of the present invention. Specifically, the present invention includes the following aspects.

[1] A soy-milk flavor improver comprising, as an active ingredient, a triacylglycerol having a medium-chain fatty acid with 6 to 12 carbon atoms as a constituent fatty acid.

[2] The soy-milk flavor improver according to [1], wherein the constituent fatty acid of the triacylglycerol having the medium-chain fatty acid is constituted only of the medium-chain fatty acid with 6 to 12 carbon atoms.

[3] The soy-milk flavor improver according to [1] or [2], wherein the constituent fatty acid of the triacylglycerol having the medium-chain fatty acid is constituted only of a medium-chain fatty acid with 8 carbon atoms and/or a medium-chain fatty acid with 10 carbon atoms.
[4] An improved soy milk comprising:
  a soy milk; and
  the soy-milk flavor improver according to any one of [1] to [3].
[5] The improved soy milk according to [4], wherein the content of the triacylglycerol having the medium-chain fatty acid contained in the soy-milk flavor improver is 5 to 15 mass % relative to the mass of the soy milk.
[6] A food or a drink comprising the improved soy milk according to [4] or [5].
[7] A method for producing an improved soy milk, comprising the step of mixing a soy milk with a triacylglycerol having a medium-chain fatty acid with 6 to 12 carbon atoms as a constituent fatty acid in such a manner that the content of the triacylglycerol having the medium-chain fatty acid is 5 to 15 mass % relative to a mass of the soy milk.
[8] The method for producing an improved soy milk according to [7], further comprising a step of emulsifying the mixture obtained in the mixing step.
[9] The method for producing an improved soy milk according to [7] or [8], wherein the constituent fatty acid of the triacylglycerol having the medium-chain fatty acid is constituted only of the medium-chain fatty acid with 6 to 12 carbon atoms.
[10] The method for producing an improved soy milk according to any one of [7] to [9], wherein the constituent fatty acid of the triacylglycerol having the medium-chain fatty acid is constituted only of a medium-chain fatty acid with 8 carbon atoms and/or a medium-chain fatty acid with 10 carbon atoms.
[11] A method for producing a food or a drink containing an improved soy milk, comprising the steps of:
  obtaining an improved soy milk by the production method according to any one of claims [7] to [10]; and
  mixing the improved soy milk with a raw material of a food or a drink.
[12] A method for improving a soy milk flavor, comprising the step of mixing a soy milk with a triacylglycerol having a medium-chain fatty acid with 6 to 12 carbon atoms as a constituent fatty acid in such a manner that the content of the triacylglycerol having the medium-chain fatty acid is 5 to 15 mass % relative to a mass of the soy milk.
[13] The method for improving a soy milk flavor according to [12], wherein the constituent fatty acid of the triacylglycerol having the medium-chain fatty acid is constituted only of the medium-chain fatty acid with 6 to 12 carbon atoms.
[14] The method for improving a soy milk flavor according to [12] or [13], wherein the constituent fatty acid of the triacylglycerol having the medium-chain fatty acid is constituted only of a medium-chain fatty acid with 8 carbon atoms and/or a medium-chain fatty acid with 10 carbon atoms.

The present invention makes it possible to produce an improved soy milk having a pleasant flavor and suppressed soybean odor, raw smell, and astringency peculiar to soybeans (improved soy milk) by simply incorporating a soy milk with a triacylglycerol having a medium-chain fatty acid with 6 to 12 carbon atoms. The improved soy milk of the present invention has a flavor with suppressed soybean odor, raw smell, and astringency peculiar to soybeans, and accordingly can satisfy the demand of people who could not have been satisfied with conventional soy milks. Moreover, since the triacylglycerol having the medium-chain fatty acid is incorporated, the improved soy milk of the present invention can be utilized as an effective beverage for supplying energy, or as a beverage for the medium-chain fatty acid to exhibit its in vivo pharmacological action. Further, adjusting the triacylglycerol content as appropriate makes it possible to provide an improved soy milk causing less irritation to the throat and having no oily taste (oiliness) when the soy milk is put into the mouth. Further, the present invention makes it possible to provide a soy-milk flavor improver containing, as an active ingredient, a triacylglycerol having a medium-chain fatty acid with 6 to 12 carbon atoms as a constituent fatty acid, and a method for improving a soy milk flavor.

DESCRIPTION OF EMBODIMENTS

Soy-Milk Flavor Improver

An embodiment of the present invention is a soy-milk flavor improver containing, as an active ingredient, a triacylglycerol having a medium-chain fatty acid with 6 to 12 carbon atoms as a constituent fatty acid. Hereinafter, the soy-milk flavor improver will be described.

Constituent Fatty Acid

The soy-milk flavor improver of the present invention contains a triacylglycerol having a medium-chain fatty acid with 6 to 12 carbon atoms as a constituent fatty acid (i.e., fat and/or oil). It is appropriate that the number of carbon atoms in the medium-chain fatty acid be more preferably 8 to 12, and furthermore preferably a combination of 8 and/or 10. The triacylglycerol may be a triacylglycerol having, as the constituent fatty acid, only a medium-chain fatty acid with 6 to 12, more preferably 8 to 12, and furthermore preferably 8 and/or 10 carbon atoms, and the like. Further, the triacylglycerol may be a mixed triacylglycerol containing, as the constituent fatty acid, other fatty acid(s) than the medium-chain fatty acid with 6 to 12 carbon atoms. Here, the position where each medium-chain fatty acid is bonded to the glycerin is not particularly limited. Moreover, in the case of a mixed triacylglycerol, the mixed triacylglycerol may contain a fatty acid other than the one with 6 to 12 carbon atoms as another constituent fatty acid, and may contain, for example, a long-chain fatty acid with 14 or more carbon atoms.

Furthermore, the triacylglycerol having the medium-chain fatty acid used in the present invention may be a mixture of, for example, trioctanoylglycerol and tridecanoylglycerol, and the like, or a mixture in which multiple different molecular species of fats and/or oils are mixed. The form is not limited, and may be liquid, solid, or powder. Here, the medium-chain fatty acid with 6 to 12 carbon atoms is preferably a linear saturated fatty acid.

The triacylglycerol having the medium-chain fatty acid that can be used in the present invention is preferably a triacylglycerol having only a medium-chain fatty acid with 6 to 12 carbon atoms as the constituent fatty acid (hereinafter may also be expressed as "MCT"). Particularly, a triacylglycerol having only a medium-chain fatty acid with 8 carbon atoms and/or a medium-chain fatty acid with 10 carbon atoms as the constituent fatty acid is more preferable.

The triacylglycerol having the medium-chain fatty acid that can be used in the present invention can be produced according to conventionally known methods. For example, the triacylglycerol can be produced by heating a fatty acid having 6 to 12 carbon atoms and a glycerol to 50 to 250° C., more preferably 120 to 180° C., in the presence of a catalyst, preferably in the absence of a catalyst, and preferably under a reduced pressure, followed by dehydration condensation.

Here, the catalyst is not particularly limited. For example, it is possible to use an acid catalyst, a base catalyst, or the like, which are used in ordinary transesterification. The term reduced pressure means, for example, 0.01 to 100 Pa, preferably 0.05 to 75 Pa, and more preferably 0.1 to 50 Pa. In this event, the water content in the system is preferably low, and is further preferably 0.2 weight % or less.

The soy-milk flavor improver of the present invention should contain, as the active ingredient, the above-described triacylglycerol having the medium-chain fatty acid with 6 to 12 carbon atoms, and may further contain other ingredients including, for example, fats and/or oils such as soybean oil and rapeseed oil, excipients such as dextrin and starch, and other quality improvers, within the ranges not to impair the effects of the present invention.

A preferable embodiment of the present invention includes an improved soy milk containing: a soy milk; and the above-described soy-milk flavor improver. Here, the soy milk includes various soy milks commonly available in the market.

In the present invention, the "soy milk" is not particularly limited, as long as it is made from soybeans. According to Section 2 of Japanese Agricultural Standards Association (enacted: Ministry of Agriculture, Forestry and Fisheries of Japan Notification No. 1800 of Nov. 16, 1981, last verified: Ministry of Agriculture, Forestry and Fisheries of Japan Notification No. 1679 of Jul. 17, 2012) regarding soy milks, "soy milk" is referred to as a milky beverage (hereinafter referred to as "soybean milk solution") obtained by eluting proteins and other ingredients from soybeans (excluding powdery soybeans and defatted soybeans. The same applies hereinafter) using hot water or the like and removing fiber, and the soybean milk solution has a soybean solid content of 8% or more. Thus, the "soy milk" of the present invention refers to a milky beverage which is produced from a soybean raw material excluding at least powdery soybeans and defatted soybeans, and which contains no fiber. Generally, a soybean beverage contains soy pulp (fiber), but a soy milk does not contain soy pulp (fiber), and thus the two are distinguished from each other. The "soy milk" of the present invention may be any of, for example, an unprocessed soy milk, a processed soy milk, and a soy milk beverage.

Here, the "unprocessed soy milk" is the above-described "soy milk" per se, and the two are the same.

Additionally, according to Japanese Agricultural Standards Association regarding soy milks above, the "processed soy milk" is referred to as: [1] a milky beverage (hereinafter referred to as "processed soy milk solution") obtained by adding a vegetable fat and/or oil such as soybean oil and a condiment (s) such as sugar and/or common salt to a soybean milk solution, and the processed soy milk solution has a soybean solid content of 6% or more; or [2] a milky beverage (hereinafter referred to as "processed defatted soybean milk solution") obtained by adding a vegetable fat and/or oil such as soybean oil and a condiment(s) such as sugar and/or common salt to defatted processed soybeans (including soybeans added) from which proteins and other ingredients have been eluted using hot water or the like and fiber has been removed, and the processed defatted soybean milk solution has a soybean solid content of 6% or more.

Moreover, according to Japanese Agricultural Standards Association regarding soy milks above, the "soy milk beverage" is referred to as: [1] a milky beverage (whose main raw material is limited to a processed soy milk solution or a processed defatted soybean milk solution. Hereinafter, the milky beverage will be referred to as "processed powdery soybean milk solution") obtained by adding a soybean protein powder (which is any one of: a powder obtained by drying a soybean milk solution, a processed soy milk solution, or a processed defatted soybean milk solution; and a powder obtained by removing fiber from a plant protein powder made from soybeans. The same applies hereinafter) to a processed soy milk solution or a processed defatted soybean milk solution, and the processed powdery soybean milk solution has a soybean solid content of 4% or more; or [2] a milky beverage (which is not a lactic acid bacteria beverage, and in which a solid content of a flavor raw material is lower than a soybean solid content and, if a squeezed fruit juice is added, a weight ratio of the squeezed fruit juice relative to the raw material is less than 10%, or if milk or a dairy product is added, the milk solid content is less than 3%) obtained by adding a squeezed fruit juice (including a purée and a mixture of a squeezed fruit juice with a purée. The same applies hereinafter), a squeezed vegetable juice, milk, a dairy product, or a flavor raw material such as flour powder to a processed soy milk solution, a processed defatted soybean milk solution, or a processed powdery soybean milk solution, and the milky beverage has a soybean solid content of 4% or more (or 2% or more if the weight ratio of the squeezed fruit juice relative to the raw material is 5% or more but less than 10%).

Further, the soy milk used in the present invention may be the same as ones used when tofu is normally produced. An example thereof includes one produced by washing raw-material soybeans with water, immersing the soybeans in water over 8 to 20 hours for swelling, grinding the soybeans with a grinder or the like, heating the resultant, and then separating and removing fiber such as soy pulp. Here, "soy pulp" is referred to as a residue after a soy milk is filtered in producing tofu, and includes fiber and other non-aqueous solid ingredients remaining after proteins and other aqueous ingredients are eluted from soybeans using hot water or the like.

Furthermore, the soy milk of the present invention also includes soy milks produced under a condition for inactivating lipoxygenase that causes the raw smell of soybeans, and soy milks utilizing lipoxygenase deficient soybeans as a raw material, and the like, these soy milks obtained so as to reduce the raw smell and astringency in soybeans and improve the flavor.

Improved Soy Milk

The improved soy milk of the present invention contains the above-described soy milk and the above-described soy-milk flavor improver. Particularly, it is appropriate that a content of the triacylglycerol having the medium-chain fatty acid with 6 to 12 carbon atoms in the soy-milk flavor improver be, for example, 5 to 15 mass % relative to a mass of the soy milk. Moreover, as described later, since the aforementioned triacylglycerol causes throat irritation, the content is preferably around 15 mass % at most. Thus, the content of the triacylglycerol contained in the improved soy milk of the present invention is preferably 8 to 15 mass %, more preferably 8 to 12 mass %, relative to the mass of the soy milk.

Further, the content of the triacylglycerol having the medium-chain fatty acid with 6 to 12 carbon atoms contained in the improved soy milk within the above-described range is preferable because an improved soy milk is obtained which has a pleasant flavor and suppressed soybean odor, raw smell, and astringency peculiar to soybeans. Note that, in the present invention, even when the content is less than 5 mass %, the effect of suppressing soybean odor, raw smell, and astringency peculiar to soybeans can conceivably be expected to some extent.

The improved soy milk of the present invention may further contain any other fat and/or oil raw materials, as long as the triacylglycerol having the medium-chain fatty acid with 6 to 12 carbon atoms is contained in a preferable amount. For example, the improved soy milk of the present invention can further contain coconut oil, palm kernel oil, palm oil, fractionated palm oil (such as palm olein or palm super olein), shea butter, fractionated shea oil, sal fat, fractionated sal oil, illipe butter, soybean oil, rapeseed oil, cotton seed oil, safflower oil, sunflower oil, rice oil, corn oil, sesame oil, olive oil, milk fat, cocoa butter, or the like, an oil-and-fat mixture thereof, a processed fat or oil thereof, or the like.

The improved soy milk of the present invention can contain, besides the above-described triacylglycerol, raw materials generally blended with soy milks. Specifically, for example, the improved soy milk of the present invention can contain a sugar, a sweetener, an acidulant, a salt, a mineral, a stabilizer, a pH adjusting agent, polysaccharide thickener, an emulsifier, a seasoning, a flavor, a colorant, a fruit, a fruit juice, tea, coffee, malt, matcha, sesame, adzuki bean, sweet potato, nut, cocoa, chocolate, or the like.

Food and Drink

Besides, the improved soy milk can also be utilized as a food and a drink containing the improved soy milk. Examples of a raw material of the food and the drink of the present invention include, in addition to processed soy milks and soy milk beverages, soybean protein beverages, lactic acid bacteria beverages, sour milk beverages, and other beverages; soybean foods such as tofu; cold desserts such as ice creams; raw confectionery products such as créme caramels, jellies, profiteroles, and cakes; confectioneries such as candies, chocolates, and biscuits; yogurts, cheeses, butters, cookies, biscuits, breads, stews, soups, sauces, dressings, other foods, drinks, or health foods, and the like.

Moreover, the raw material also includes foods and drinks normally produced from milk but substituting the milk with a soy milk.

Method for Producing Improved Soy Milk

Hereinafter, a method for producing an improved soy milk of the present invention will be described in order.

The method for producing an improved soy milk of the present invention uses a soy milk as described above as a raw material, and includes the step of mixing the soy milk with a triacylglycerol having a medium-chain fatty acid with 6 to 12 carbon atoms as a constituent fatty acid in such a manner that a content of the triacylglycerol having the medium-chain fatty acid is 5 to 15 mass % relative to a mass of the soy milk, and optionally further includes a step of emulsifying the mixture obtained in the mixing step.

Here, the definitions and preferable ranges of the raw-material soy milk, the triacylglycerol having the medium-chain fatty acid with 6 to 12 carbon atoms, and the content of the triacylglycerol having the medium-chain fatty acid are as described above.

The soy milk of the present invention and the triacylglycerol having the medium-chain fatty acid with 6 to 12 carbon atoms can be mixed according to conventionally known methods. An example of the method includes as follows.

Specifically, first, a soy milk is prepared by a conventional known method. Here, the soy milk may be any of an unprocessed soy milk, a processed soy milk, and a soy milk beverage as described above. Nevertheless, in consideration of the object of the present invention, preferable is an unprocessed soy milk which still has soybean odor, raw smell, and astringency peculiar to soybeans. Then, the triacylglycerol having the medium-chain fatty acid is added to the soy milk, and for example, thoroughly stirred and mixed, so that a soy milk emulsified with the triacylglycerol is produced. Here, the temperature during the mixing should be around normal temperature (25° C.). For the stirring, a mixer, a paddle mixer, a homogenizer, or the like is used, which are commonly used in ordinary stirring.

The method for emulsifying the mixture of the soy milk of the present invention may be performed by an ordinary emulsifying method. Although the method is not particularly limited, a mixer, a colloidal mixer, a paddle mixer, an agitator, a homogenizer, or the like is used. Further, it is more preferable to utilize a homogenizer such as, for example, a high-pressure homogenizer, a Manton-Gaulin homogenizer, or a multi-flow homogenizer.

Method for Producing Food or Drink

Further, the food and the drink containing the improved soy milk of the present invention can be produced by a method including: the above-described step of obtaining an improved soy milk; and a step of mixing the obtained improved soy milk with a raw material of a food or a drink. Here, the raw material of a food or a drink is a food or a drink which have no improved soy milk added yet, and examples thereof include the above-described processed soy milks, soy milk beverages, soybean protein beverages, lactic acid bacteria beverages, sour milk beverages, and other beverages; soybean foods such as tofu; cold desserts such as ice creams; raw confectionery products such as créme caramels, jellies, profiteroles, and cakes; confectioneries such as candies, chocolates, and biscuits; yogurts, cheeses, butters, cookies, biscuits, breads, stews, soups, sauces, dressings, other foods, drinks, or health foods, and the like. Moreover, the raw material of a food or a drink also includes raw materials which are foods and drinks normally produced from milk but substituting the milk with a soy milk, and which have no soy milk added yet.

Method for Improving Soy Milk Flavor

Meanwhile, as described above, adding a triacylglycerol having a medium-chain fatty acid with 6 to 12 carbon atoms to a soy milk makes it possible to modify the soy milk to be a soy milk having a pleasant flavor and suppressed soybean odor, raw smell, and astringency peculiar to soybeans. Thus, the present invention also relates to a method for improving a soy milk flavor, the method including the step of mixing a soy milk with a triacylglycerol having a medium-chain fatty acid with 6 to 12 carbon atoms as a constituent fatty acid in such a manner that a content of the triacylglycerol having the medium-chain fatty acid is 5 to 15 mass % relative to a mass of the soy milk. As described below, the use of the soy-milk flavor improver of the present invention in the production of an improved soy milk makes it possible to modify conventional soy milks to be soy milks having a pleasant flavor and suppressed soybean odor, raw smell, and astringency peculiar to soybeans. Here, the definitions and preferable ranges of the soy milk used as the raw material, the triacylglycerol having the medium-chain fatty acid with 6 to 12 carbon atoms, and the content of the triacylglycerol having the medium-chain fatty acid are as described above.

EXAMPLES

Next, the present invention will be described in more details based on Examples and Comparative Examples. However, the present invention is not limited at all thereto.

Hereinafter, "%" means mass % unless otherwise specifically stated.

Triacylglycerols as fats and/or oils were analyzed for composition by employing a gas chromatograph method (according to JAOCS, vol 70, 11, 1111-1114 (1993)).

Constituent fatty acids of the fat and/or oil were analyzed by employing the gas chromatograph method (according to AOCS Celf-96).

<Raw-Material Fat and/or Oil>

[MCT1]: MCT1 designates a triacylglycerol (manufactured by The Nisshin OilliO Group, Ltd., product name: MCT-C10R) constituted only of medium-chain fatty acids having 8 and 10 carbon atoms in which: the fatty acids constituting the triacylglycerol were octanoic acid (8 carbon atoms) and decanoic acid (10 carbon atoms); and a ratio (mass ratio) of the fatty acids constituting the triacylglycerol was octanoic acid:decanoic acid=30:70.

[MCT2]: MCT2 designates a triacylglycerol (manufactured by The Nisshin OilliO Group, Ltd., product name: O.D.O) constituted only of medium-chain fatty acids having 8 and 10 carbon atoms in which: the fatty acids constituting the triacylglycerol were octanoic acid (8 carbon atoms) and decanoic acid (10 carbon atoms); and a ratio (mass ratio) of the fatty acids constituting the triacylglycerol was octanoic acid:decanoic acid=75:25.

[Rice oil]: Rice oil used was rice oil (manufactured by The Nisshin OilliO Group, Ltd., product name: Nisshin Oishii Komeyu (delicious rice oil) in which: fatty acids constituting the triacylglycerol were palmitic acid (16 carbon atoms), oleic acid (18 carbon atoms), linoleic acid (18 carbon atoms), and the balance; and a ratio (mass ratio) of the fatty acids constituting the triacylglycerol was palmitic acid:oleic acid:linoleic acid:the balance=approximately 17:42:36:5.

[Canola oil]: Canola oil used was canola oil (manufactured by The Nisshin OilliO Group, Ltd., product name: Nisshin Canolayu (canola oil) in which: fatty acids constituting the triacylglycerol were palmitic acid (16 carbon atoms), oleic acid (18 carbon atoms), linoleic acid (18 carbon atoms), and the balance; and a ratio (mass ratio) of the fatty acids constituting the triacylglycerol was palmitic acid:oleic acid:linoleic acid:the balance=approximately 4:61:20:15.

Example 1

The MCT1 or MCT2 was dispensed into test tubes in amounts of 0 mass %, 5 mass %, 10 mass %, 15 mass %, and 20 mass % relative to the following unprocessed soy milk. Then, 50 ml of the commercially-available unprocessed soy milk (Kibun Oishii Muchousei Tounyu (delicious unprocessed soy milk): manufactured by Kikkoman Beverage Company) was dispensed into each test tube. These solutions were thoroughly stirred and mixed, so that emulsified test soy milks were produced.

Comparative Example 1

Into each of test tubes, 50 ml of a commercially-available unprocessed soy milk (Kibun Oishii Muchousei Tounyu (delicious unprocessed soy milk): manufactured by Kikkoman Beverage Company) was dispensed. Then, the above-described rice oil or canola oil was added into each test tube in amounts of 0 mass %, 5 mass %, 10 mass %, 15 mass %, and 20 mass % relative to the unprocessed soy milk. These solutions were thoroughly stirred and mixed, so that emulsified test soy milks were produced.

Sensory Evaluation

The obtained soy milks were subjected to a sensory evaluation by ten panelists. In the evaluation, higher scores indicate better results. Note that a score indicates an average value of the ten panelists.

The soybean odor, raw smell, astringency, throat irritation, and oiliness were scored using three points.

Score 3: not felt at all
Score 2: slightly felt
Score 1: clearly felt.

The overall evaluation was scored using five points.

Score 5: having a pleasant flavor and delicious.
Score 4: lacking a pleasant flavor somewhat, but drunk deliciously
Score 3: lacking a pleasant flavor, but suitable as a commercial product
Score 2: generating unpleasant flavor, and not suitable as a commercial product
Score 1: having a strongly unpleasant flavor, and intolerable as a drink

TABLE 1

MCT1 evaluation result

| Added amount (%) | Overall evaluation | Soybean odor | Raw smell | Astringency | Throat irritation | Oiliness |
|---|---|---|---|---|---|---|
| 5 | 4.6 | 2.7 | 2.5 | 2.9 | 2.8 | 3.0 |
| 10 | 4.8 | 2.8 | 2.6 | 2.8 | 2.6 | 3.0 |
| 15 | 4.2 | 2.7 | 2.8 | 2.8 | 2.2 | 3.0 |
| 20 | 3.6 | 2.8 | 2.8 | 2.7 | 1.5 | 3.0 |
| 0 (control) | 3.2 | 1.3 | 1.2 | 1.4 | 3.0 | 3.0 |

TABLE 2

MCT2 evaluation result

| Added amount (%) | Overall evaluation | Soybean odor | Raw smell | Astringency | Throat irritation | Oiliness |
|---|---|---|---|---|---|---|
| 5 | 4.5 | 2.6 | 2.4 | 2.7 | 2.9 | 3.0 |
| 10 | 4.7 | 2.7 | 2.6 | 2.6 | 2.7 | 3.0 |
| 15 | 4.5 | 2.7 | 2.7 | 2.5 | 2.5 | 3.0 |
| 20 | 3.8 | 2.6 | 2.8 | 2.5 | 1.0 | 3.0 |
| 0 (control) | 3.2 | 1.3 | 1.2 | 1.4 | 3.0 | 3.0 |

TABLE 3

Rice oil evaluation result

| Added amount (%) | Overall evaluation | Soybean odor | Raw smell | Astringency | Throat irritation | Oiliness |
|---|---|---|---|---|---|---|
| 5 | 3.3 | 2.2 | 1.6 | 1.4 | 3.0 | 3.0 |
| 10 | 3.4 | 2.6 | 2.0 | 1.5 | 3.0 | 2.8 |
| 15 | 3.5 | 2.8 | 2.5 | 1.5 | 3.0 | 2.5 |

TABLE 3-continued

Rice oil evaluation result

| Added amount (%) | Overall evaluation | Soybean odor | Raw smell | Astringency | Throat irritation | Oiliness |
|---|---|---|---|---|---|---|
| 20 | 3.5 | 2.8 | 2.8 | 1.8 | 3.0 | 2.3 |
| 0 (control) | 3.2 | 1.3 | 1.2 | 1.4 | 3.0 | 3.0 |

TABLE 4

Canola oil evaluation result

| Added amount (%) | Overall evaluation | Soybean odor | Raw smell | Astringency | Throat irritation | Oiliness |
|---|---|---|---|---|---|---|
| 5 | 3.4 | 2.1 | 1.7 | 1.6 | 3.0 | 2.8 |
| 10 | 3.0 | 2.4 | 2.0 | 1.6 | 3.0 | 2.3 |
| 15 | 2.8 | 2.4 | 2.2 | 1.7 | 3.0 | 1.8 |
| 20 | 2.2 | 2.6 | 2.3 | 1.8 | 3.0 | 1.0 |
| 0 (control) | 3.2 | 1.3 | 1.2 | 1.4 | 3.0 | 3.0 |

As is apparent from the results of Tables 1 and 2 above, the improved soy milk to which MCT1 or MCT2 was added suppressed the soybean odor, raw smell, and astringency peculiar to soybeans. Moreover, the improved soy milk to which MCT1 or MCT2 was added was a smoothly drinkable beverage having no oiliness but rather a refreshing sensation.

Meanwhile, as is apparent from the results of Tables 3 and 4 above, the test soy milk to which the rice oil or canola oil was added suppressed the soybean odor and raw smell peculiar to soybeans to some extent, but did not suppress the astringency much. Moreover, the test soy milk to which the rice oil or canola oil was added was smoothly drinkable, but had a unique oiliness. These test soy milks were quite unsuitable as a beverage based on the overall evaluations.

The invention claimed is:

1. A method for producing an improved soy milk, comprising the step of mixing a soy milk with a triacylglycerol having a medium-chain fatty acid with 6 to 12 carbon atoms as a constituent fatty acid in such a manner that the content of the triacylglycerol having the medium-chain fatty acid is 5 to 15 mass % relative to a mass of the soy milk, wherein the constituent fatty acid of the triacylglycerol having the medium-chain fatty acid is constituted only of the medium-chain fatty acid with 6 to 12 carbon atoms.

2. The method for producing an improved soy milk according to claim 1, further comprising a step of emulsifying the mixture obtained in the mixing step.

3. The method for producing an improved soy milk according to claim 1, wherein the constituent fatty acid of the triacylglycerol having the medium-chain fatty acid is constituted only of a medium-chain fatty acid with 8 carbon atoms and/or a medium-chain fatty acid with 10 carbon atoms.

4. A method for producing a food or a drink containing an improved soy milk, comprising the steps of:
    obtaining an improved soy milk by the production method according claim 1; and
    mixing the improved soy milk with a raw material of a food or a drink.

5. A method for improving a soy milk flavor, the method comprising the step of mixing a soy milk with a triacylglycerol having a medium-chain fatty acid with 6 to 12 carbon atoms as a constituent fatty acid in such a manner that the content of the triacylglycerol having the medium-chain fatty acid is 5 to 15 mass % relative to a mass of the soy milk, wherein the constituent fatty acid of the triacylglycerol having the medium-chain fatty acid is constituted only of the medium-chain fatty acid with 6 to 12 carbon atoms.

6. The method for improving a soy milk flavor according to claim 5, wherein the constituent fatty acid of the triacylglycerol having the medium-chain fatty acid is constituted only of a medium-chain fatty acid with 8 carbon atoms and/or a medium-chain fatty acid with 10 carbon atoms.

* * * * *